Feb. 26, 1963 V. R. SPITALERI ETAL 3,078,622

ROUTER BIT GRINDER

Filed Nov. 13, 1959 3 Sheets-Sheet 1

INVENTORS
VERNON R. SPITALERI
LELAND H. SATRE
BY
Hazard & Miller
ATTORNEYS

Feb. 26, 1963 V. R. SPITALERI ETAL 3,078,622

ROUTER BIT GRINDER

Filed Nov. 13, 1959 3 Sheets-Sheet 2

INVENTORS
VERNON R. SPITALERI
LELAND H. SATRE
BY Hazard & Miller
ATTORNEYS

ROUTER BIT GRINDER

Filed Nov. 13, 1959 3 Sheets-Sheet 3

INVENTORS
VERNON R. SPITALERI
LELAND H. SATRE
BY Hazard & Miller
ATTORNEYS

United States Patent Office 3,078,622
Patented Feb. 26, 1963

3,078,622

ROUTER BIT GRINDER

Vernon R. Spitaleri, Newport Beach, and Leland H. Satre, Whittier, Calif., assignors to Sta-Hi Corporation, Whittier, Calif., a corporation of California Filed Nov. 13, 1959, Ser. No. 852,667
5 Claims. (Cl. 51—124)

This invention relates to a grinder for grinding and sharpening router bits used for routing stereo-type plates.

Explanatory of the present invention, after a plurality of duplicate stereo-type plates have been cast or molded, it is necessary to rout out of such plates selected portions such as for example around the edges of the plates and portions within the marginal boundaries of the plates. Multiple routers have heretofore been produced on which two or more duplicate stereo-type plates can be mounted. A plurality of chucks for routing bits are on such a margin and routing bits are mounted therein and are simultaneously rotated and moved with relation to the stereo-type plates so as to simultaneously rout out the corresponding portions of each plate. Heretofore, the routing bits have been sharpened by hand and in so doing, it is extremely difficult if at all possible, to produce two routing bits which are identical with each other with respect to the length of the bit, the rake of the cutting edge, and the clearance. Identity of the bits is of course highly desirable inasmuch as both bits are to cut and remove identically corresponding portions from the identical stereo-type plates that are mounted on the multiple plate router.

An object of the present invention is to provide a grinder for sharpening router bits which will enable two router bits to be sharpened by a grinding wheel in identically the same manner as to length, rake, and clearance. If the router bits are sharpened in this manner they may be mounted on a multiple router and identical portions can be routed from the stereo-type plates.

With the foregoing and other objects in view, which will be made manifest in the following detailed description and specifically pointed out in the appended claims, reference is had to the accompanying drawings for an illustrative embodiment of the invention, wherein:

Figures 1, 2:
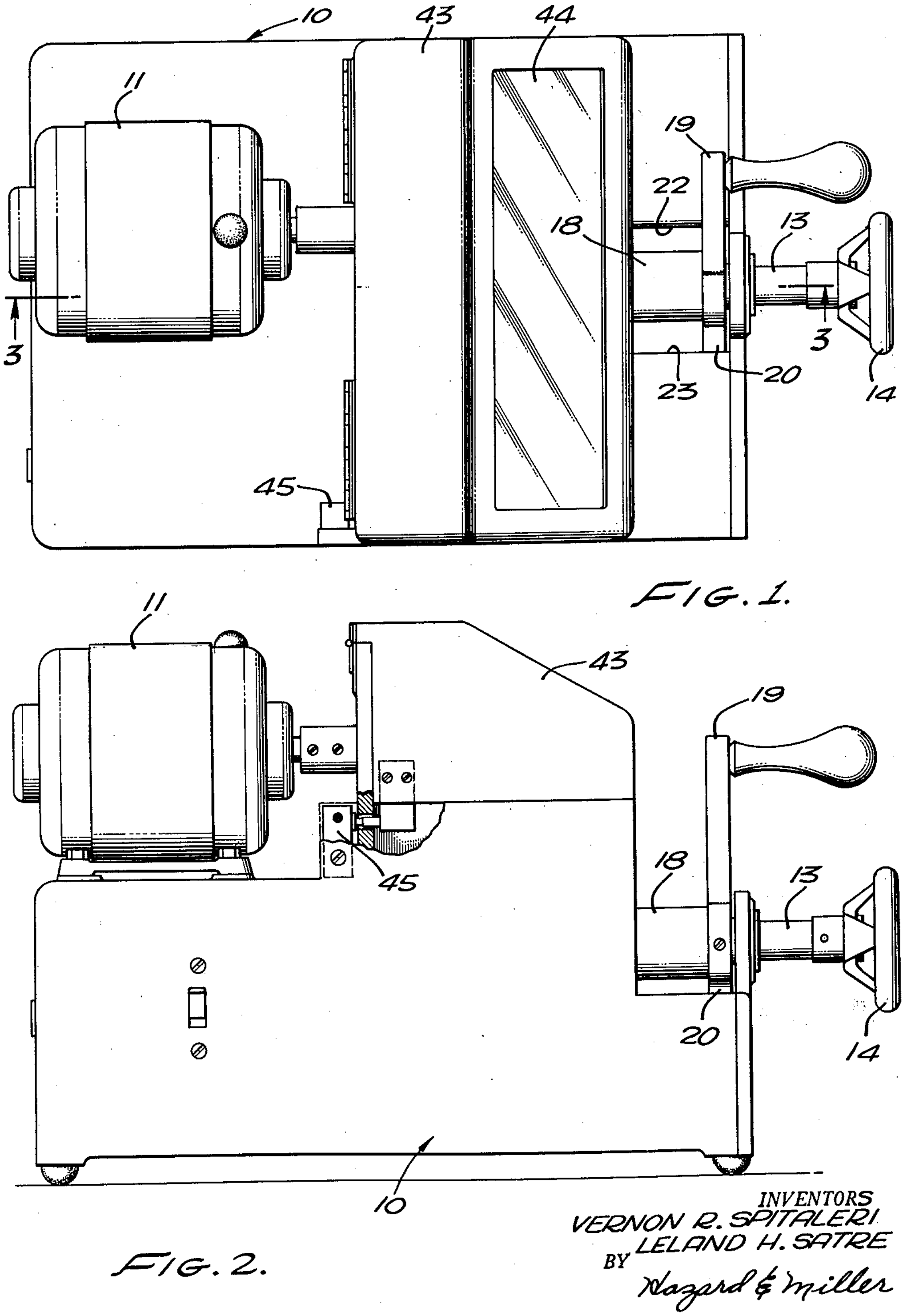
FIGURE 1 is a top plan view of a router bit grinder embodying the present invention.
FIG. 2 is a view in side elevation of the same, parts being broken away and shown in vertical section.

Referring to the accompanying drawings wherein similar reference characters designate similar parts throughout, the improved grinder comprises a suitable frame or housing generally indicated at 10 and on which there is mounted an electric motor 11 that rotates a hollow or cup-shaped grinding wheel 12. A feed screw 13 extends through walls of the frame or housing 10 and is rotatable by means of a handle or handwheel 14. The threads of this feed screw screw into a nut or threaded bushing 15 that is stationarily mounted in the frame or housing 10. This feed screw is frictionally held in any adjusted position by means of a nylon Dutchman 16 that is held in engagement with the threads of the feed screw by a set screw 17. A sleeve 18 surrounds the feed screw 13 and is adapted to be rocked with relation thereto by means of a handle 19. This handle has a downwardly extending extension 20 that is engageable with edges 21 and 22, see FIG. 4, on walls of the frame 10 to limit the amount of swinging movement of the sleeve by the handle.

A coil compression spring 23 is interposed between the nut or bushing 15 and the sleeve to urge the sleeve 18 constantly towards its forwardmost position with relation to the feed screw as limited by the bushing 23*a* that is rigid with the feed screw.

On the rotatable or swingable sleeve 18 there is mounted an arm 24 on which there is a bit holder, generally designated at 25. This bit holder is designed to have two router bits 26 and 27 mounted thereon so that both may be swung by the arm 24 across the annular face of the rotary grinding wheel 12 to grind the cutting edge of both bits in an identical manner with respect to the overall length of the bit and with respect to the rack and clearance of the bit.

It will be observed from an inspection of FIG. 4 that the grinding wheel 12 rotates about its horizontal axis and that the axis of rotation of the feed screw 13 and of the sleeve 18 is parallel thereto but spaced below and to the left of the axis of rotation of the grinding wheel. The axis of rotation of the feed screw 13 and of the sleeve 18 is vertically beneath the center of the annular grinding face of the grinding wheel 12 considered at the location horizontally to the left of the axis of rotation of the grinding wheel.

The bit holder 25 consists of a base member 28 preferably formed integral with the arm 24. On the top surface of this base member there are formed two V grooves 29 and 30 which are spaced laterally from the center line of the arm 24. These grooves are designed to partially receive the shanks of the router bits 26 and 27. They are formed in an inclined top surface of the base member 28 so that the shanks of the router bits 26 and 27 will be inclined to the plane of the face of the grinding wheel 12. These grooves are milled in the base member 28 so as to be in radial planes with respect to the axis of rotation or swing of the arm 24. In other words, when the center of groove 30 is opposite the center of the annular face of the grinding wheel the bottom of the groove will be in a plane which includes the center of the grinding face and the axis of swing of the arm 24. Similarly, when groove 29 is opposite the center of the annular grinding face of the grinding wheel it will be in a vertical plane containing the center of the grinding face and the axis of swing of the arm 24. Consequently, as viewed in plan on the top of the base member 28 of the bit holder there is a slight divergence of these grooves toward the plane of the face of the grinding wheel.

A clamping member 31 is provided which can be tightened downwardly by means of a thumb screw 32 which extends through the clamping member and which is threaded into the base member 28 of the bit holder. A coil compression spring 33 surrounds this thumb screw and serves to lift the clamping member as the thumb screw is unscrewed. The movements of the clamping member are guided by means of dowels 34 and 35 which extend across the grooves 29 and 30. These dowels not only serve to guide the clamping member but also function as stops engageable by the ends of the shanks of the router bits 26 and 27. The dowels are equally spaced from the face of the grinding wheel so that when the two router bits 26 and 27 are positioned thereagainst and are pressed against the grinding wheel the two bits will be ground to identical lengths.

Figures 4, 5, 6, 7:
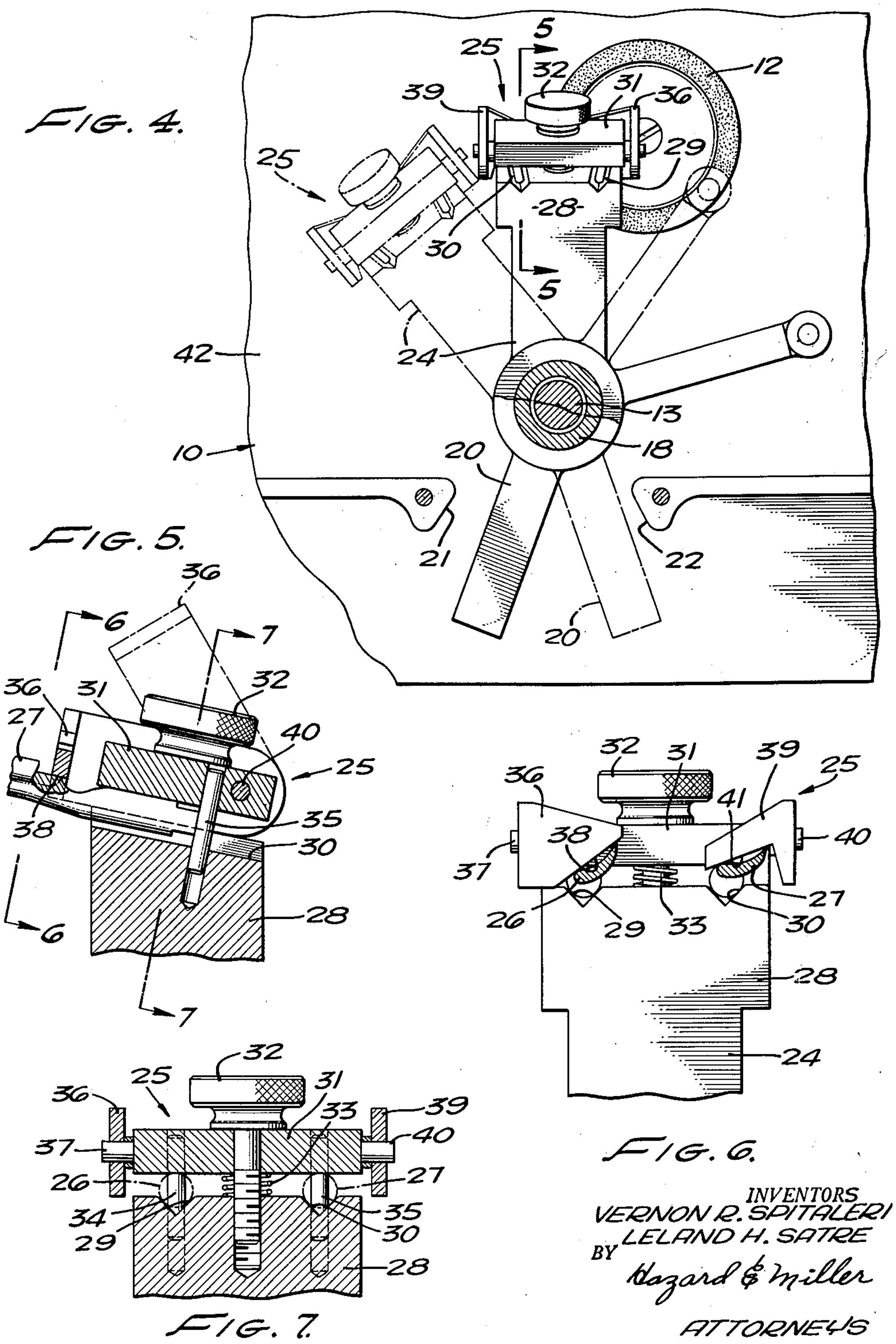
FIG. 4 is a sectional view taken substantially upon the line 4—4 upon FIG. 3, in the direction indicated.
FIG. 5 is a sectional view taken substantially upon the line 5—5 upon FIG. 4, to illustrate details of construction of the bit holder.
FIG. 6 is a view taken substantially upon the line 6—6 upon FIG. 5.
FIG. 7 is a view taken substantially upon the line 7—7 upon FIG. 5.

It will be observed from an inspection of FIG. 4 that the groove 30 containing router bit 26 is in advance relationship with respect to the center line of the arm 24 and that the groove 29 which contains the bit 27 is in trailing relationship to the center line as the arm 24 is swung from the dotted line position shown in FIG. 4 through the full line position in causing the two bits to consecutively traverse the grinding face of the grinding wheel. Because of this advance and trailing relationship the two bits 26 and 27 must be differently oriented in their respective grooves 30 and 29 as illustrated in FIG. 6, in order to grind the two bits with identical rakes and clearances. Thus, as illustrated in this figure, the bit 26 has been turned so that its cutting edge is more inclined than the cutting edge of bit 27.

In order to properly orient or position the two bits 26 and 27 we provide on the clamping block 31 two movably or swingably mounted templates or guides. One of such templates or guides is indicated at 36 and is pivotally mounted at one end of the clamping block as indicated at 37. This template presents an inclined edge 38 that is engageable with the two side edges of the concave blade of the router bit. In a similar manner, a second template or guide 39 is pivoted at 40 on the opposite end of the clamping block 31 and presents an inclined edge 41 that is engageable with the side edges of the concave blade of the router bit 27. These templates or guides can be swung independently of each other to engage their grooves 30 and 29. As the inclination of the edge 38 is different from the inclination of edge 41 the engagement of these edges with the router bits will turn the router bits in their respective grooves to the positions shown and which, as will be observed from FIG. 6, are different from each other. While the router bits are being held in their respective positions by the templates and guides 36 and 39 the clamping block 31 is tightened on the shanks of the router bits by means of the thumb screws 32 and thereafter the templates can be swung on their pivots 37 and 40 into inoperative positions.

With the bits mounted on the bit holder 25 in the manner above described, the handle 14 of the feed screw 13 can be rotated to advance the sleeve 18 and the bit holder 25 toward the face of the grinding wheel 12. In any setting of the feed screw the handle 19 is employed to swing the arm 24 about the axis of the feed screw and thus swing both router bits 26 and 27 consecutively across the annular face of the grinding wheel. Following each pass of both bits across the face of the grinding wheel an additional advancement of the bit holder toward the grinding wheel can be accomplished by rotation of the feed screw 13. Both router bits will consequently be ground in identical manners with respect to length, rake, and clearance. The lengths of the bits are governed by the shanks engaging their respective dowels 34 and 35 and although the router bit 26 in groove 30 is in advance relationship with respect to the face of the grinding wheel and the router bit 27 in groove 29 is in trailing relationship thereto, the rakes and clearances of the two bits will be identical due to the fact that the blades of the bits have been differently oriented in the bit holder as determined by the edges 38 and 41 of the templates.

It will thus be appreciated that by the improved grinder it is possible to simultaneously grind two router bits and have the two bits identical with each other. The two bits can be loosely positioned in their respective grooves 29 and 30 and while loosely disposed therein they can be properly rotatably oriented so that the cutting edges of the blades will be presented toward the grinding face of the grinding wheel to give identical rakes and clearances.

Figure 3:
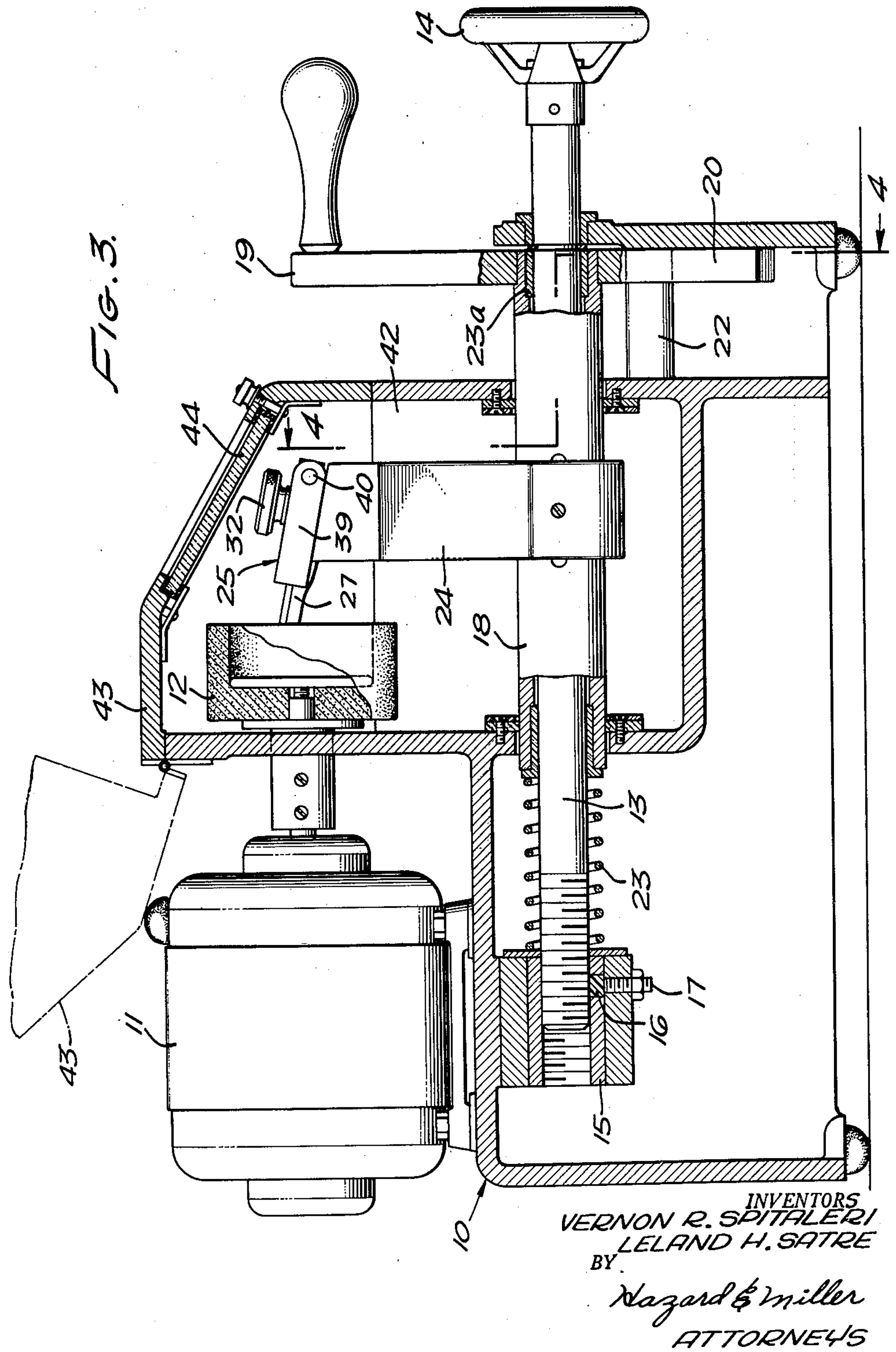
FIG. 3 is a vertical section taken substantially upon the line 3—3 upon FIG. 1 in the direction indicated.

The grinding wheel 12, the arm 24, and the bit holder 25 are preferably all located within a compartment 42 provided by the frame 10 having a hinged cover 43 in which there is a window 44 through which the grinding operation may be observed. This hinged cover preferably has associated therewith a switch 45 that controls the circuit of the electric motor 11 so that whenever the cover is lifted into the dotted line position illustrated in FIG. 3, the circuit through the motor 11 is automatically broken to stop rotation of the grinding wheel.

Various changes may be made in the details of construction without departing from the spirit and scope of the invention as defined by the appended claims.

We claim:

1. A grinder for router bits comprising a power driven rotary grinding wheel, a bit holder swingable across the face of the grinding wheel about an axis parallel to the axis of rotation of the grinding wheel, means for mounting a plurality of router bits on the bit holder, a guide movably mounted on the bit holder for engagement with each bit to rotatably orient each bit about the axis of its shank so as to cause each bit to be properly presented toward the grinding wheel, and means for advancing and retracting the position of the bit holder with relation to the face of the grinding wheel.

2. A grinder for router bits comprising a power driven rotary grinding wheel, a bit holder movable across the face of the grinding wheel, said bit holder having a plurality of grooves therein adapted to partially receive the shanks of a plurality of router bits, the axes of the grooves being inclined to the face of the grinding wheel, a guide movably mounted on the bit holder for engagement with the bits to rotatably orient each bit about the axis of its shank while in the groove so as to cause the bits to be properly presented toward the grinding wheel, and means for advancing and retracting the position of the bit holder with relation to the face of the grinding wheel.

3. A grinder for router bits comprising a power driven rotary grinding wheel, a bit holder, means for advancing and retracting the bit holder toward and away from the face of the grinding wheel, an arm on which the bit holder is mounted mounted for swinging movement across the face of the grinding wheel about an axis parallel to the axis of rotation of the grinding wheel, said bit holder having a groove in which the shank of a routing bit is partially receivable, a stop in the groove against which the shank is engageable, and means on the bit holder engageable with the routing bit to rotatably orient the bit with respect to the bit holder to cause it to have its cutting end properly presented toward the face of the grinding wheel.

4. A grinder for router bits comprising a power driven rotary grinding wheel, a bit holder, means for advancing and retracting the bit holder toward and away from the face of the grinding wheel, an arm on which the bit holder is mounted mounted for swinging movement across the face of the grinding wheel about an axis parallel to the axis of rotation of the grinding wheel, said bit holder having two spaced grooves thereon each of which is adapted to partially receive the shank of a router bit, said grooves being located in planes radially of the axis of swing of said arm, means for clamping the shanks of the router bits in said grooves, and means swingably mounted on the bit holder engageable with each router bit for rotatably orienting the router bits in their respective grooves prior to clamping so that each will have its cutting end properly presented toward the grinding wheel.

5. A grinder for router bits comprising a power driven rotary grinding wheel, a bit holder, means for advancing and retracting the bit holder toward and away from the face of the grinding wheel, an arm on which the bit holder is mounted mounted for swinging movement across the face of the grinding wheel about an axis parallel to the axis of rotation of the grinding wheel, said bit holder having two spaced grooves thereon each of which is adapted to partially receive the shank of a router bit, said grooves being located in planes radially of the axis of swing of said arm, means for clamping the shanks of the router bits in said grooves, and means swingably mounted on the bit holder engageable with each router bit independently of the other for rotatably orienting the router bits in their respective grooves independently of each other prior to clamping so that each will have its cutting end properly presented toward the grinding wheel.

References Cited in the file of this patent

UNITED STATES PATENTS

| | | |
|---|---|---|
| 2,144,095 | Zwick | Jan. 17, 1939 |
| 2,302,937 | Clark | Nov. 24, 1942 |
| 2,509,402 | Volkel | May 30, 1950 |
| 2,525,264 | Milner et al. | Oct. 10, 1950 |